US010909852B2

(12) United States Patent
Zheng et al.

(10) Patent No.: US 10,909,852 B2
(45) Date of Patent: Feb. 2, 2021

(54) INTELLIGENT TRAFFIC SAFETY PRE-WARNING METHOD, CLOUD SERVER, ONBOARD-TERMINAL AND SYSTEM

(71) Applicant: SHANDONG PROVINCIAL COMMUNICATIONS PLANNING AND DESIGN INSTITUTE CO., LTD, Shandong (CN)

(72) Inventors: Lizhi Zheng, Shandong (CN); Rishuang Sun, Shandong (CN); Lingtao Zhang, Shandong (CN); Lin Li, Shandong (CN); Lei Hu, Shandong (CN); Guogang Wang, Shandong (CN); Ying Li, Shandong (CN); Shujuan Ji, Shandong (CN); Lili Chen, Shandong (CN)

(73) Assignee: SHANDONG PROVINCIAL COMMUNICATIONS PLANNING AND DESIGN INSTITUTE CO., LTD, Shandong (CN)

(*) Notice: Subject to any disclaimer, the term of this patent is extended or adjusted under 35 U.S.C. 154(b) by 0 days.

(21) Appl. No.: 16/638,469

(22) PCT Filed: Apr. 12, 2018

(86) PCT No.: PCT/CN2018/082875
§ 371 (c)(1),
(2) Date: Feb. 12, 2020

(87) PCT Pub. No.: WO2019/144511
PCT Pub. Date: Aug. 1, 2019

(65) Prior Publication Data
US 2020/0365031 A1 Nov. 19, 2020

(30) Foreign Application Priority Data
Jan. 26, 2018 (CN) .......................... 2018 1 0076996

(51) Int. Cl.
*G08G 1/16* (2006.01)
*G08G 1/01* (2006.01)

(52) U.S. Cl.
CPC .......... *G08G 1/164* (2013.01); *G08G 1/0112* (2013.01); *G08G 1/0133* (2013.01); *G08G 1/0141* (2013.01); *G08G 1/166* (2013.01)

(58) Field of Classification Search
CPC .... G08G 1/164; G08G 1/0112; G08G 1/0133; G08G 1/0141; G08G 1/166
See application file for complete search history.

(56) References Cited

U.S. PATENT DOCUMENTS

| 6,369,720 B1* | 4/2002 | Wilhelm | ................ G08G 1/163 340/435 |
| 8,520,695 B1* | 8/2013 | Rubin | ............... H04W 56/0035 370/445 |
| 2007/0027583 A1* | 2/2007 | Tamir | ..................... G08G 1/164 701/1 |

(Continued)

FOREIGN PATENT DOCUMENTS

| CN | 102941853 | 2/2013 |
| CN | 105513425 | 4/2016 |

(Continued)

OTHER PUBLICATIONS

"International Search Report (Form PCT/ISA/210) of PCT/CN2018/082875", dated Oct. 15, 2018, with English translation thereof, pp. 1-4.

*Primary Examiner* — Thomas D Alunkal
(74) *Attorney, Agent, or Firm* — JCIP Global Inc.

(57) ABSTRACT

The present invention discloses an intelligent traffic safety pre-warning method, a cloud server, onboard-terminals and a system. The method comprises: a step (101): the onboard-terminal establishes a communication connection with the cloud server; a step (102): the onboard-terminal acquires data, and uploads data calculated based on the acquired data to the cloud server; a step (103): the onboard-terminal receives feedbacks from the cloud server, the feedback comprising the probability that the current vehicle has an accident within a set range of the current road segment; and (Continued)

a step (104): the onboard-terminal receives the probability that the current vehicle has an accident within the set range of the current road segment, and then transmits the feedback to the driver by human-computer interaction. The method, the cloud server, the onboard-terminals and the system fill in the gaps in traffic safety, danger pre-warning, and low visibility driving safety guarantee in rain, fog and the like in the traffic field, and ensure that the driving behavior is safer.

7 Claims, 4 Drawing Sheets

(56) References Cited

U.S. PATENT DOCUMENTS

| | | | | |
|---|---|---|---|---|
| 2008/0288162 | A1* | 11/2008 | Theimer | G08G 1/164 |
| | | | | 701/117 |
| 2011/0298603 | A1* | 12/2011 | King | G08G 1/042 |
| | | | | 340/436 |
| 2012/0016627 | A1* | 1/2012 | Nagura | G08G 1/161 |
| | | | | 702/150 |
| 2016/0169688 | A1* | 6/2016 | Kweon | G08G 1/162 |
| | | | | 701/522 |
| 2019/0180523 | A1* | 6/2019 | Unno | B60W 30/02 |

FOREIGN PATENT DOCUMENTS

| | | |
|---|---|---|
| CN | 105938660 | 9/2016 |
| CN | 106297340 | 1/2017 |
| CN | 106960602 | 7/2017 |
| JP | 2004348254 | 12/2004 |

\* cited by examiner

INTELLIGENT TRAFFIC SAFETY PRE-WARNING METHOD, CLOUD SERVER, ONBOARD-TERMINAL AND SYSTEM

CROSS-REFERENCE TO RELATED APPLICATION

This application is a 371 of international application of PCT application serial no. PCT/CN2018/082875, filed on Apr. 12, 2018, which claims the priority benefit of China application no. 201810076996.2, filed on Jan. 26, 2018. The entirety of each of the above mentioned patent applications is hereby incorporated by reference herein and made a part of this specification.

FIELD OF THE INVENTION

The present invention relates to the fields of road traffic safety monitoring, driving safety guarantee in low visibility weather and danger pre-warning technologies, in particular to an intelligent traffic safety pre-warning method, a cloud server, onboard-terminals and a system.

BACKGROUND OF THE INVENTION

At present, it is almost blank in the field of intelligent traffic safety pre-warning for vehicles driven on highways. The driving safety completely depends on the driving experience of a driver, mainly by observing surrounding topography, landform and terrain through eyes, observing surrounding risks and vehicles ahead and road conditions, learning following vehicles information through a rearview mirror, then they control their own driving habits after sensing surrounding information.

Based on this, the driving safety is achieved. However, as to the fields of intelligent safety monitoring and danger pre-warning, it is almost blank.

SUMMARY OF THE INVENTION

Objectives of the present invention are to fill the gaps in driving safety and danger pre-warning in the traffic field, ensure that the driving behavior is safer and the danger is more predictable, achieve more real-time and dynamic traffic organizing and unimpeded traffic during reconstruction and expansion of highways, save social manpower and material resources, achieve the purposes of traffic organizing and diversion, ensure minimum impact on the society, and avoid frequent traffic accidents that cannot be overcome by human sensory limits in low visibility situations such as rain and fog.

In order to achieve the above objectives, the present invention adopts the following technical solutions:

An intelligent traffic safety pre-warning method, including:

a step (101): an onboard-terminal establishes a communication connection with a cloud server;

a step (102): the onboard-terminal acquires data, processes the acquired data and then uploads the data to the cloud server;

a step (103): the onboard-terminal receives feedbacks of the cloud server; wherein the feedbacks includes the probability that the current vehicle has an accident within the current road segment; and a step (104): after receiving the probability that the current vehicle has an accident within a set range of the current road segment, the onboard-terminal determines whether the probability exceeds a set critical value, and sends, if the probability exceeds the set critical value, the feedback to the driver by human-computer interaction.

The step (101) includes: the onboard-terminal is started, the onboard-terminal establishes a communication connection with the cloud server, and the onboard-terminal sends its communication address to the cloud server.

The step (102) includes: after the onboard-terminal entering a road network, the onboard-terminal locates its position coordinates, the onboard-terminal calculates its position, speed, acceleration or direction by using the position coordinates and time, uploads the calculated data to the cloud server, and the onboard-terminal cyclically uploads its driving data to the cloud server within a set time duration t.

The intelligent traffic safety pre-warning method further includes:

a step (105): the establishment of a region block relationship, including: the current onboard-terminal receives communication addresses of surrounding onboard-terminals within the set range sent by the cloud server, the current onboard-terminal establishes a connection relationship with the surrounding onboard-terminals through the communication addresses, the onboard-terminal receives current vehicle driving danger coefficients sent by the cloud server, gives an accident probability warning according to the current driving speed, the current road condition or the current vehicle condition, and sends the warning information to the driver by human-computer interaction;

The intelligent traffic safety pre-warning method further includes:

a step (106): the operation after the establishment of the region block relationship, including: the current onboard-terminal cyclically broadcasts its position, speed, acceleration or driving behavior safety coefficient to the surrounding onboard-terminals within a set time duration t, and the driving data of the surrounding onboard-terminals is also transmitted to the current onboard-terminal as such;

during the current onboard-terminal driving at a normal speed, when an ahead vehicle is decelerating, the moment the current onboard-terminal receives the driving data of the onboard-terminal of the ahead vehicle, the current onboard-terminal calculates a relative position distance between two vehicles within a safety time according to the positions, speeds, and accelerations of such two vehicles, and determines whether there is an impact for the relative position distance; if there is an impact for the relative position distance, the current onboard-terminal immediately transmits warning information to the driver, and simultaneously transmits the warning information to the onboard-terminal of the ahead vehicle, and the onboard-terminal of the ahead vehicle transmits the information obtained by its determination and the received warning information to the its driver;

during the current onboard-terminal driving at a normal speed, if the ahead vehicle is changing lanes, the moment the current onboard-terminal receives the driving data of the onboard-terminal of the ahead vehicle, the current onboard-terminal calculates a relative position distance between two vehicles within a safety time according to the positions, speeds, and accelerations of such two vehicles, and determines whether there is an impact for the relative position distance; if there is an impact for the relative position distance, the current onboard-terminal transmits information about paying attention to lane change of the ahead vehicle to the driver, and transmits prompt information about paying attention to safety driving to the onboard-terminal of the ahead vehicle in the meantime;

during the current onboard-terminal driving at a normal speed, if a following vehicle is accelerating, the moment the current onboard-terminal receives the driving data of the onboard-terminal of the following vehicle, the current onboard-terminal calculates a relative position distance between two vehicles within a safety time according to the positions, speeds, and accelerations of such two vehicles, and determines whether there is an impact for the relative position distance; if there is an impact for the relative position distance, the current onboard-terminal gives a warning about paying attention to the following vehicle to the driver, and transmits prompt information about paying attention to the ahead vehicle to the onboard-terminal of the following vehicle;

during the acceleration, the current onboard-terminal calculates relative position distance between each of the vehicles ahead within a safety time according to the positions, speeds, and accelerations of such two vehicles, and determines whether there is an impact for the relative position distance; if there is an impact for the relative position distance, the current onboard-terminal transmits corresponding warning information to the driver by human-computer interaction, and reversely feeds the warning information back to the corresponding vehicle.

The intelligent traffic safety pre-warning method further includes:

a step (107): the update of the region block relationship, including:

the current onboard-terminal receives communication addresses which are calculated by the cloud server belonging to the vehicles around and sent by the cloud server at a set time interval, and superposes the communication addresses into its region block;

when the following vehicle is driven to the ahead of the current vehicle, the current onboard-terminal transmits the communication addresses in its region block to the onboard-terminal of the overtaking vehicle, and the onboard-terminal in the overtaking vehicle superposes the received region block communication addresses information into its region block, and deletes the terminal communication addresses beyond a set distance to update its region block;

when the ahead vehicle lags behind the current vehicle, the current onboard-terminal transmits its region block communication addresses to the onboard-terminal of the lagging vehicle, and the onboard-terminal of the lagging vehicle superposes the received region block communication addresses with its region block, and deletes the terminal communication addresses beyond the set distance to update its region block;

after the current vehicle receiving the region block communication addresses transmitted by the vehicle that is overtaken by the current vehicle or overtakes the current vehicle, the current vehicle superposes the received region blocks into its region block, and deletes the terminal communication addresses beyond the set distance to update its region block, thereby realizing the realtime superposition of data among the established region block of the current onboard-terminal, the region block transmitted by the surrounding onboard-terminals, and the communication addresses transmitted by the cloud server.

An intelligent traffic safety pre-warning method, including:

a step (201): a cloud server receives a position, speed, acceleration or direction sent by an onboard-terminal, determines a driver's driving danger coefficient (e.g., whether a dangerous driving behavior exists) according to the position, speed, and acceleration information within a set time period, calculates the probability that the current vehicle has an accident within a set range of the current road segment based on the driver's driving danger coefficient, horizontal and longitudinal indicators of the road segment and accident probabilities under the corresponding indicators, and feeds back, if the probability exceeds a set threshold, a danger warning to the onboard-terminal;

a step (202): the cloud server based on the received position, speed, acceleration or direction of the current onboard-terminal, the cloud server calculates surrounding onboard-terminals that may enter a set range of the current onboard-terminal within a set time according to the position, the speed and the acceleration, and transmits communication addresses of the corresponding surrounding onboard-terminals to the current onboard-terminal; and a step (203): the cloud server broadcasts the location and communication addresses of an accident to all the onboard-terminals along the road segment affected by the accident to prompt other onboard-terminals to slow down.

A cloud server, including: a first processor, wherein the first processor is connected to a first storage and a first human-computer interaction module respectively, the first processor is further connected to an onboard-terminal through a first communication module, the first storage stores computer instructions performed on the first processor, and when the computer instructions are performed on the first processor, the following steps are performed:

receiving a position, speed, acceleration or direction sent by an onboard-terminal, determining, by the cloud server, a driver's driving danger coefficient (e.g., whether a dangerous driving behavior exists) according to the position, speed, and acceleration information within a set time period, calculating the probability that the current vehicle has an accident within a set range of the current road segment based on the driver's driving danger coefficient, horizontal and longitudinal indicators of the road segment and accident probabilities under the corresponding indicators, and feeding back, if the probability exceeds a set threshold, a danger warning to the onboard-terminal; based on the received position, speed, acceleration or direction of the current onboard-terminal, calculating, by the cloud server, surrounding onboard-terminals that may enter a set range of the current onboard-terminal within a set time according to the position, the speed and the acceleration, and transmitting communication addresses of the interfering surrounding onboard-terminals to the current onboard-terminal; and broadcasting the location and communication addresses of an accident to all the onboard-terminals along the road segment affected by the accident to prompt other onboard-terminals to slow down.

An onboard-terminal, including: a second processor, wherein the second processor is connected to a positioning module, a second storage, and a second human-computer interaction module respectively, the second processor is further connected to a cloud server through a second communication module, the second storage stores computer instructions performed on a second processor, and when the computer instructions are performed on the second processor, the following steps are performed:

establishing a communication connection with the cloud server; acquiring data, and uploading the acquired data to the cloud server; receiving feedbacks from the cloud server, wherein the feedbacks including the probability that the current vehicle has an accident within a set range of the current road segment; receiving the probability that the current vehicle has an accident within the set range of the current road segment, and transmitting, if the probability exceeds a set danger value, the feedback to a driver by human-computer interaction;

receiving communication addresses of surrounding onboard-terminals within the set range transmitted by the cloud server, and establishing a connection relationship with the surrounding onboard-terminals through the communication addresses; broadcasting the position, speed, acceleration or driving behavior safety coefficient to the surrounding onboard-terminals, and similarly, receiving driving data of the surrounding onboard-terminals.

An intelligent traffic safety pre-warning system, including: the cloud server and the onboard-terminal.

Compared with the prior art, the present invention has the following advantages: After receiving accident probability information of the road segment and road segment ahead, the onboard-terminal transmits the information to the driver through audio or images to ensure that the driver takes safe driving measures.

The cloud server embeds therein horizontal alignment, vertical alignment and cross-section data of a regional road network and safety evaluation data of each road segment. After all position information of onboard-terminals transmitted to the cloud server is acquired, for each onboard-terminal transmitting the information, surrounding onboard-terminals that may affect the terminal within certain time t are calculated and identified, and communication addresses of the surrounding onboard-terminals are returned to each onboard-terminal.

After receiving the communication addresses of the surrounding onboard-terminals, the current onboard-terminal transmits its position, speed, and acceleration information to the surrounding onboard-terminals, acquires the position, speed, and acceleration information transmitted by the surrounding onboard-terminals, and calculates a mutual position relationship and a position relationship that may occur in future time to determine whether the position, speed, and acceleration information of the surrounding onboard-terminals threatens the current onboard-terminal; if threatening will rise, the current onboard-terminal generates an audio and video warning through the human-computer interaction module to prompt the driver of the current onboard-terminal to pay attention to safety and take corresponding driving measures; and if the onboard-terminal calculates an impact on the surrounding onboard-terminals through its position, speed, and acceleration information, the onboard-terminal immediately transmits the information to the surrounding onboard-terminals to prompt the surrounding onboard-terminals to pay attention to safety and take corresponding driving measures.

Under the cooperation of the cloud server and the onboard-terminal, the cooperative communication among the current onboard-terminal, the surrounding onboard-terminals, and the cloud server is realized, self-safety is ensured, possible dangers are early warned, and corresponding traffic density is informed to each onboard-terminal in advance, so that the traffic is safer and more intelligent.

BRIEF DESCRIPTION OF THE DRAWINGS

The accompanying drawings constituting a part of the present application are used for providing a further understanding of the present application, and the schematic embodiments of the present application and the descriptions thereof are used for interpreting the present application, rather than constituting improper limitations to the present application.

DETAILED DESCRIPTION OF EMBODIMENTS

It should be pointed out that the following detailed descriptions are all exemplary and aim to further illustrate the present application. Unless otherwise specified, all technical and scientific terms used herein have the same meanings generally understood by those of ordinary skill in the art of the present application.

It should be noted that the terms used herein are merely for describing specific embodiments, but are not intended to limit exemplary embodiments according to the present application. As used herein, unless otherwise explicitly pointed out by the context, the singular form is also intended to include the plural form. In addition, it should also be understood that when the terms "include" and/or "comprise" are used in the specification, they indicate features, steps, operations, devices, components and/or their combination.

Figure 1:
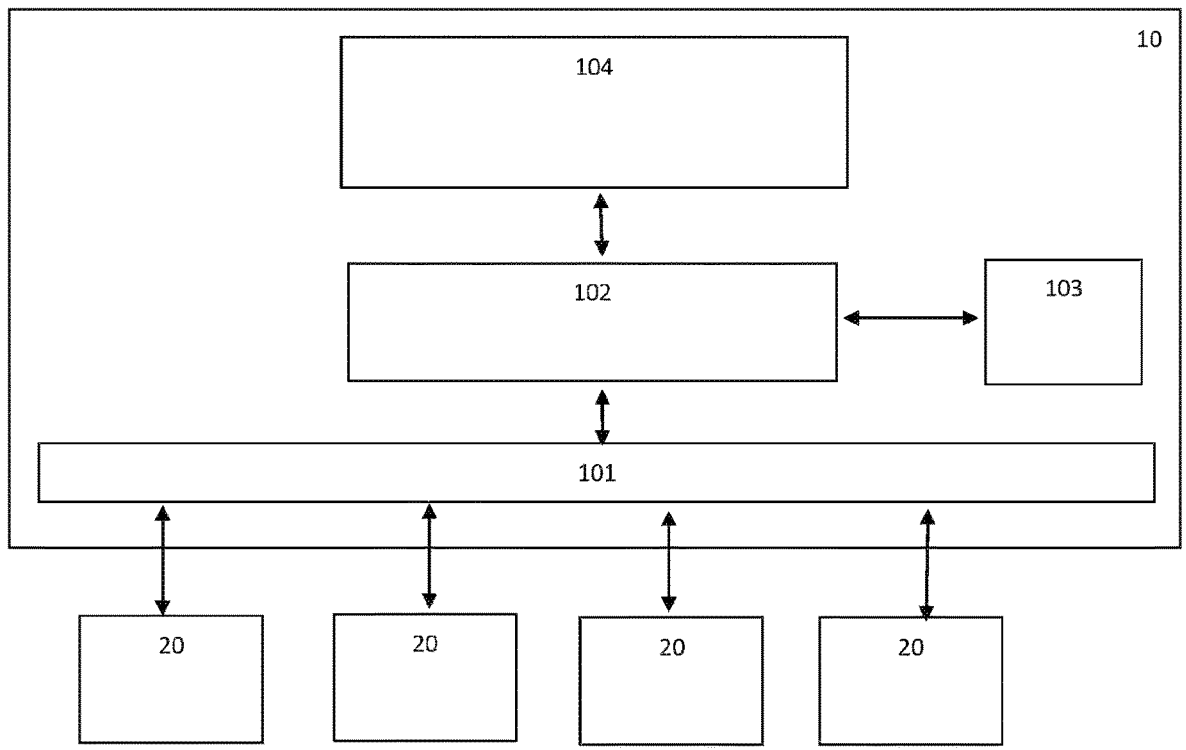
FIG. 1 is a structural diagram of a cloud server according to the present invention.

As shown in FIG. 1, a traffic safety and organization system based on region block technology according to the present invention includes: a cloud server 10 and onboard-terminals 20.

The cloud server includes a first communication module 101, a first processor 102, a first storage module 103, and a first human-computer interaction module 104.

Wherein, the first communication module 101 is used for the communication with each onboard-terminal, including transmitting data and receiving data transmitted by the onboard-terminals.

The first processor 102 processes the received data through a built-in processing program.

The first storage 103 is used for storing relevant information.

The first human-computer interaction module 104 is used for displaying the relevant information to relevant personnel.

Figure 2:
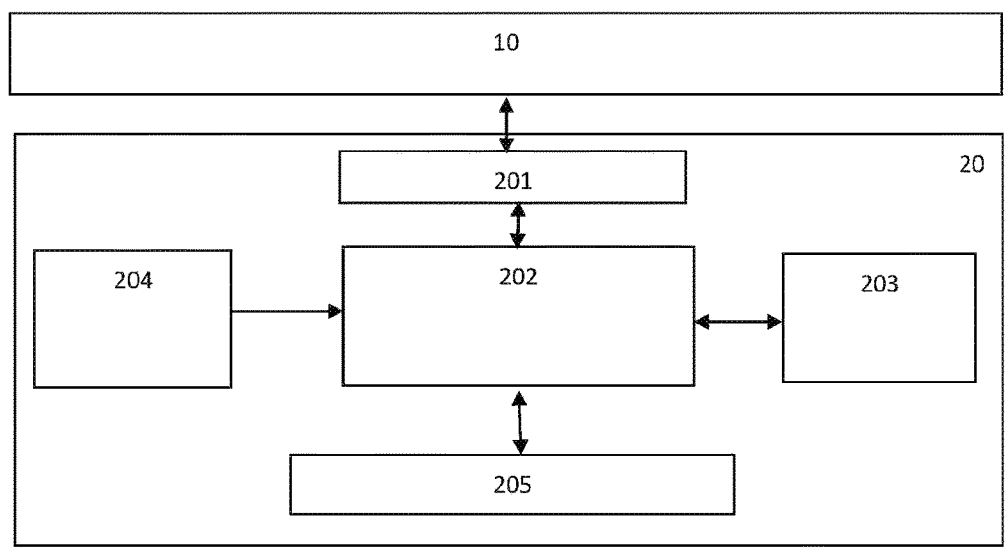
FIG. 2 is a structural diagram of an onboard-terminal according to the present invention.

As shown in FIG. 2, the onboard-terminal 20 includes a second communication module 201, a second processor 202, a second storage 203, a positioning module 204, and a second human-computer interaction module 205.

Wherein, the second communication module 201 is used for the communication with the cloud server.

The second processor 202 is used for processing its data and information received from the cloud server, from a region block, from a driver and from passengers.

The second processor 203 is used for storing relevant information.

The positioning module 204 is used for performing real-time positioning at a program-indicated time point or within a program-indicated time interval, and transmitting the positioning information to the second processor 202.

The second human-computer interaction module 205 is used for displaying the relevant information to relevant personnel.

Figure 4:
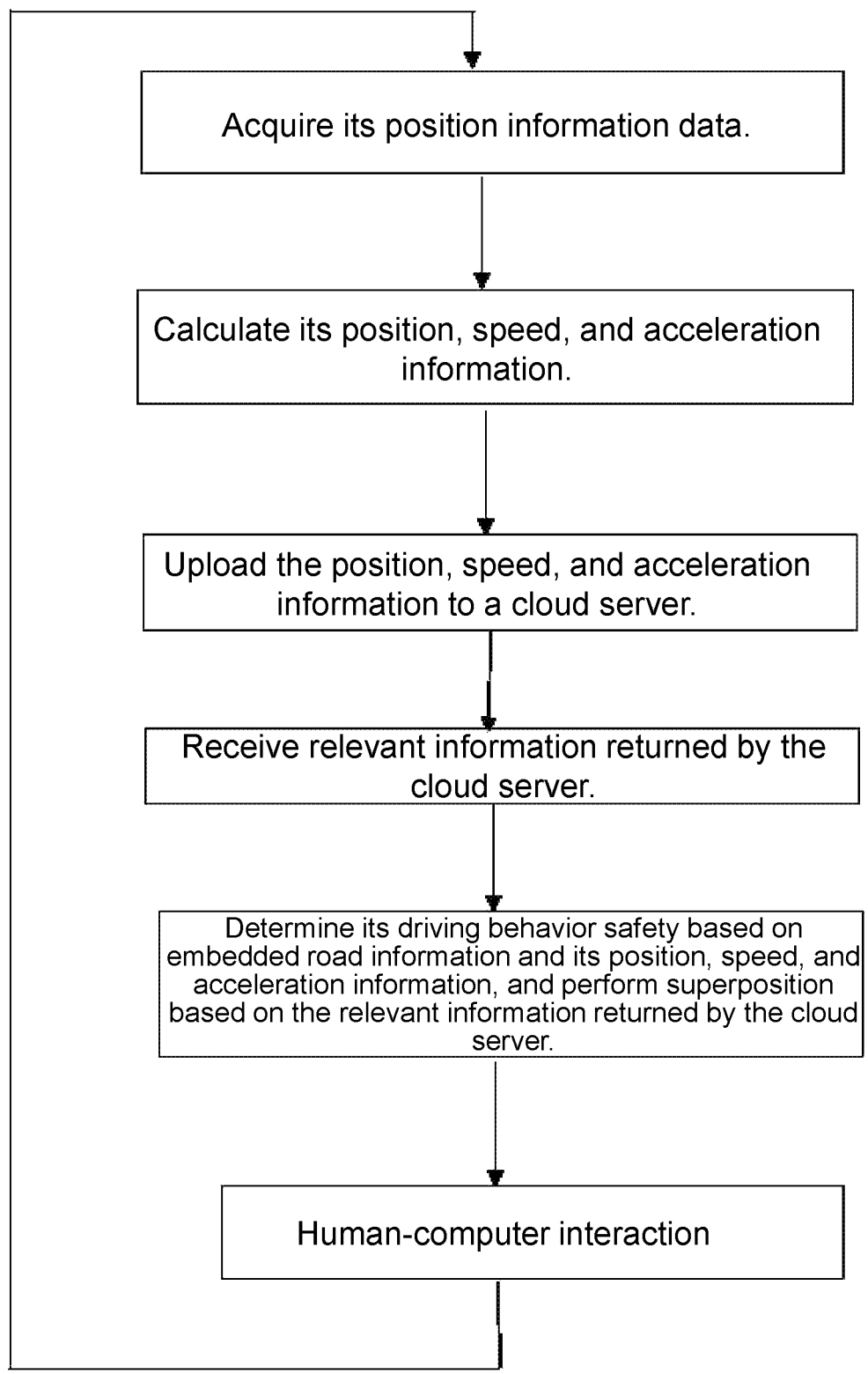
FIG. 4 is a flowchart of data processing of the onboard-terminal itself according to the present invention.

The operating method of the present invention is as follows:

As shown in FIG. 4, after the vehicle is started, the onboard-terminal is started, the positioning module 204 locates its position and transmits the position information to the second processor 202, a processor module of the onboard-terminal calculates its position, speed, acceleration and driving safety level according to the position and time, transmits these calculation results to the second storage 203 for storage and the second communication module 201, and the second communication module 201 transmits them to the cloud server.

Figure 3:
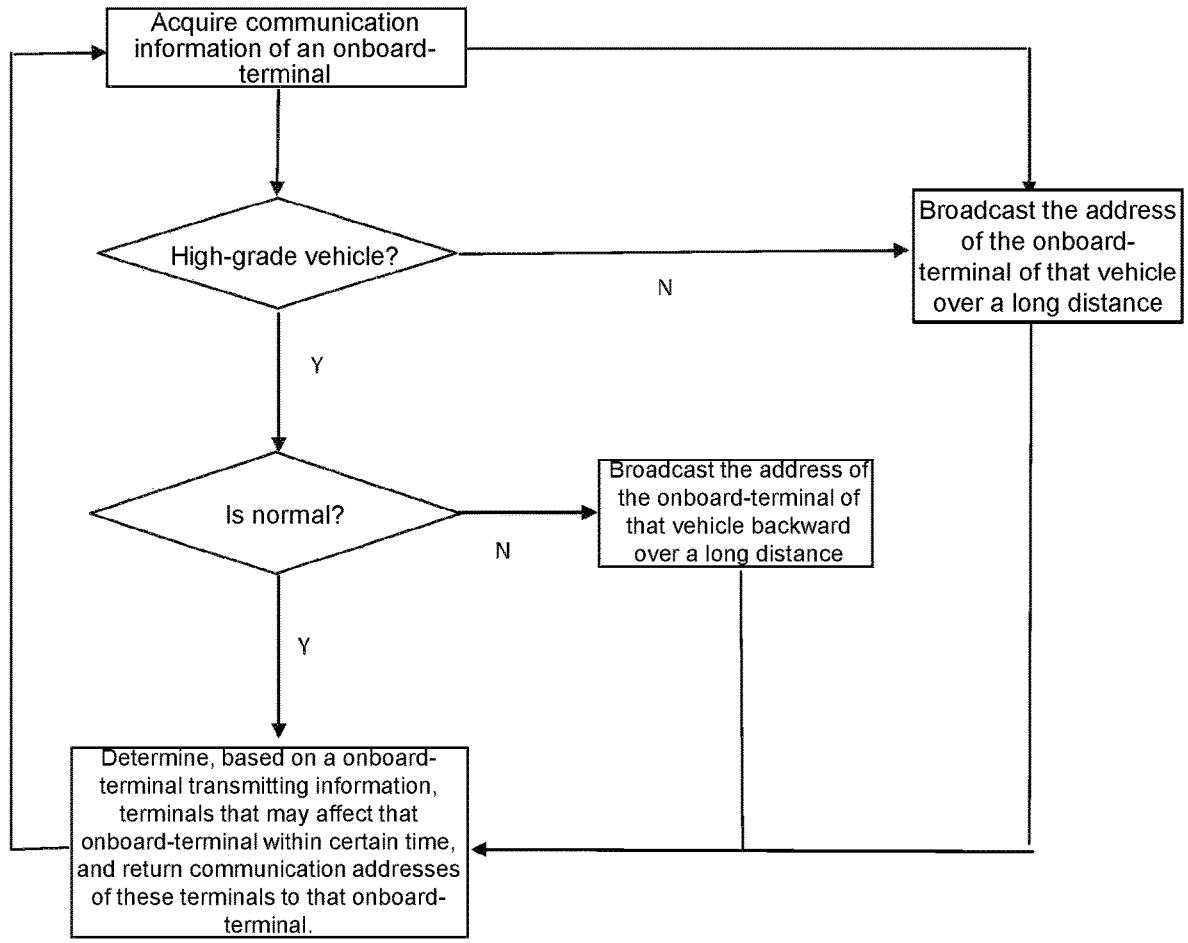
FIG. 3 is a flowchart of data processing of a cloud client according to the present invention.

As shown in FIG. 3, after receiving the information of the vehicle, the cloud server determines whether the vehicle is a high-grade vehicle. If the vehicle is a high-grade vehicle (e.g., a police vehicle, an ambulance, a fire vehicle, a road administration vehicle, etc.), the cloud server, based on a program-defined algorithm, broadcasts the information of the vehicle such as communication address and position, speed, acceleration and driving safety level to corresponding vehicles along the way, in order to remind the corresponding vehicles of avoiding. Whether the vehicles are in an accident state, the number of vehicles in the accident state and the severity of the accident are calculated again according to the internal algorithm of the cloud server, and the corresponding information is timely fed back to a general command center through the first human-computer interaction module 104, to launch an emergency plan timely. In addition to this, the cloud server calculates the number of vehicles ahead of and following the current vehicle within a safety time, and sends communication addresses of the onboard-terminals of these vehicles to the current vehicle.

Figure 5:
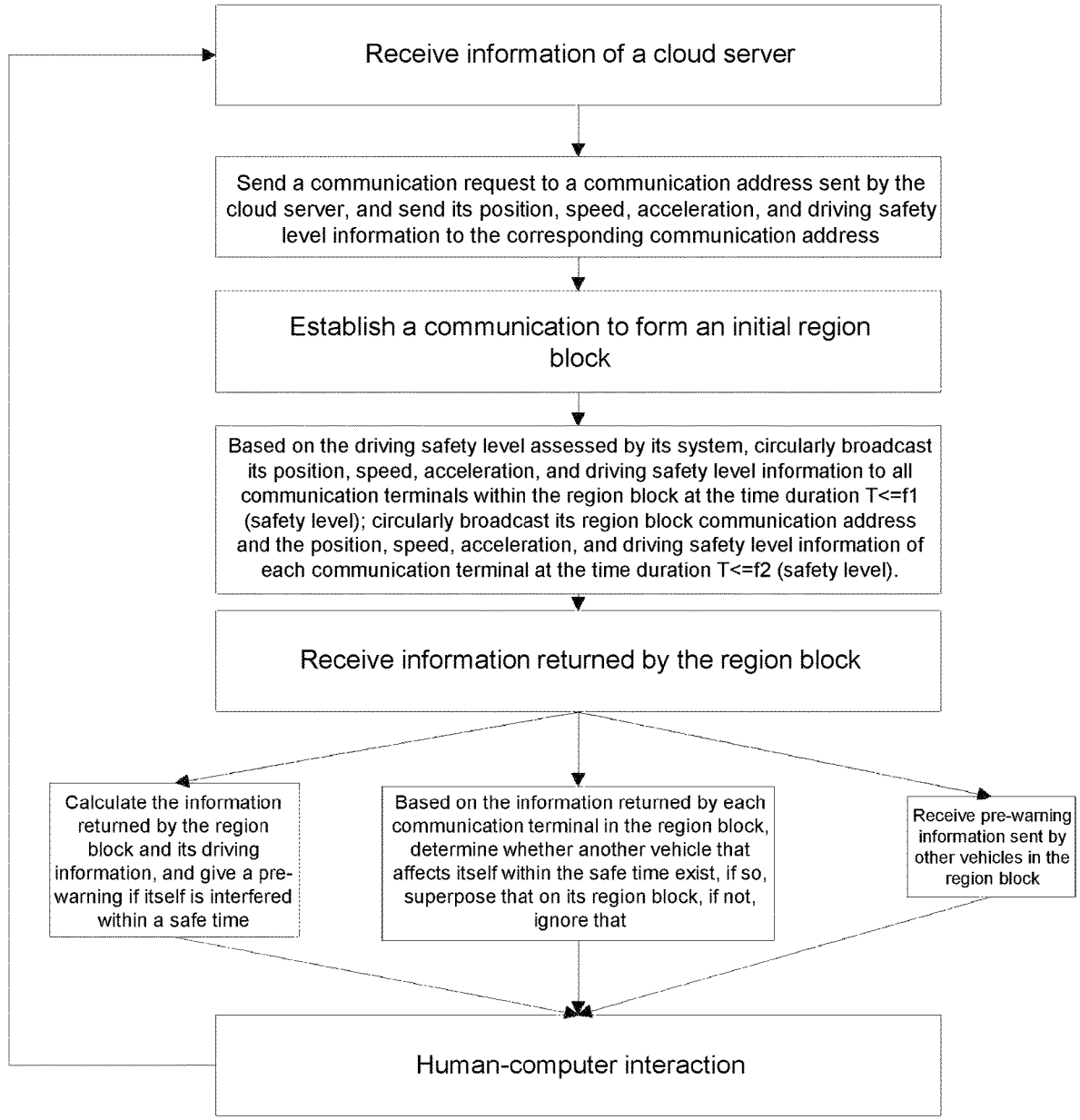
FIG. 5 is a flowchart of region block information processing of the onboard-terminal according to the present invention.

As shown in FIG. 5, after receiving the information sent by the cloud server, the onboard-terminal collects statistics on the communication addresses of onboard-terminals of response vehicles that may affect the driving of the current vehicle within the safety time in such information, and sends to them a message requesting to establish a connection, and after the other vehicles receive the request, they make a determination and establish a connection, thus forming an initial region block network.

Within the time duration of T<=f1 (safety level), the onboard-terminal cyclically broadcasts its position, speed, acceleration, and driving safety level information to all communication terminals within a region block, and processes the acquired position, speed, acceleration, and driving safety level information of all the communication terminals within the region block through embedded software; if a vehicle affecting the current vehicle is found, then the human-computer interaction module of the onboard-terminal of the current vehicle gives feedbacks to its driver and passengers, e.g., an alarm "Pay attention to the right rear overtaking vehicle of 140 km/h at 100 m", or "Pay attention to the ahead vehicle at 100 m that is changing lanes and decelerating".

Within the time duration of T<=f2 (safety level), the current vehicle cyclically broadcasts its region block communication address and cyclically broadcasts the position, speed, acceleration, and driving safety level information of each communication terminal, and processes the acquired corresponding information transmitted by other vehicles in the region block at the same time; if the vehicle position, speed, and acceleration calculated would affect the current vehicle within a certain time, the communication address is superposed on the region block of the current vehicle; and if no affect is caused, the communication address is ignored.

If the current vehicle itself perceives that it will affect the surrounding vehicles during driving, the current vehicle sends information to the corresponding vehicles affected, to prompt them to pay attention to the safety, superposes the received information sent by the other vehicles with warning information calculated by software of current vehicle at the same time, and feeds back the superposed information to the driver or passenger through the human-computer interaction module of the onboard-terminal.

Described above are merely preferred embodiments of the present application, and the present application is not limited thereto. Various modifications and variations may be made to the present application for those skilled in the art. Any modification, equivalent substitution, improvement or the like made within the spirit and principle of the present application shall fall into the protection scope of the present application.

What is claimed is:

1. An intelligent traffic safety pre-warning method, the method comprising:

a step (101): an onboard-terminal establishes a communication connection with a cloud server;

a step (102): the onboard-terminal acquires data, processes the acquired data and then uploads the processed data to the cloud server;

a step (103): the onboard-terminal receives feedbacks of the cloud server, wherein the feedback comprises the probability that a current vehicle has an accident within a current road segment;

a step (104): after receiving the probability that the current vehicle has an accident within a set range of the current road segment, the onboard-terminal determines whether the probability exceeds a set critical value, and sends, if the probability exceeds the set critical value, the feedback to a driver by human-computer interaction;

a step (105): an establishment of a region block relationship, including: a current onboard-terminal receives communication addresses of surrounding onboard-terminals within a set range sent by the cloud server, the current onboard-terminal establishes a connection relationship with the surrounding onboard-terminals through the communication addresses, the onboard-terminal receives a current vehicle driving danger coefficient sent by the cloud server, and gives an accident probability warning according to a current driving speed, a current road condition or a current vehicle condition, and sends a warning information to the driver by human-computer interaction;

a step (106): an operation after the establishment of the region block relationship, including: the current onboard-terminal cyclically broadcasts its position, speed, acceleration or driving behavior safety coefficient to the surrounding onboard-terminals within a set time duration t, driving data of the surrounding onboard-terminals is also transmitted to the current onboard-terminal as such; and a step (107): an update of the region block relationship, including:

the current onboard-terminal receives communication addresses sent by the cloud server at a set time interval, and superposes the communication addresses into its region block;

when a following vehicle is driven ahead of the current vehicle, the current onboard-terminal transmits the communication addresses in its region block to an onboard-terminal of the overtaking vehicle, and the onboard-terminal in the overtaking vehicle superposes the received region block communication addresses information into its region block, and deletes the terminal communication addresses beyond a set distance to update its region block;

when an ahead vehicle lags behind the current vehicle, the current onboard-terminal transmits its region block communication addresses to an onboard-terminal of the lagging vehicle, and the onboard-terminal of the lagging vehicle superposes the received region block communication addresses with its region block, and deletes the terminal communication addresses beyond the set distance to update its region block;

after the current vehicle receiving the region block communication addresses transmitted by the vehicle that is overtaken by the current vehicle or overtakes the current vehicle, the current vehicle superposes the received region block into its region block, and deletes the terminal communication addresses beyond the set distance to update its region block, thereby realizing the realtime superposition of data among the established region block of the current onboard-terminal, the region block transmitted by the surrounding onboard-terminals, and the communication address transmitted by the cloud server.

2. The intelligent traffic safety pre-warning method according to claim 1, wherein the step (101) comprises: the onboard-terminal is started, the onboard-terminal establishes the communication connection with the cloud server, and the onboard-terminal sends its communication address to the cloud server.

3. The intelligent traffic safety pre-warning method according to claim 1, wherein the step (102) comprises: after the onboard-terminal entering a road network, the onboard-terminal locates its position coordinates, the onboard-terminal calculates its position, speed, acceleration or direction by using the position coordinates and time, uploads the calculated data to the cloud server, and the onboard-terminal cyclically uploads its driving data to the cloud server within a set time duration t.

4. The intelligent traffic safety pre-warning method according to claim 1, wherein the step (106) further comprising:

during the current onboard-terminal driving at a normal speed, when an ahead vehicle decelerating, the moment the current onboard-terminal receives the driving data of an onboard-terminal of the ahead vehicle, the current onboard-terminal calculates a relative position distance between two vehicles within a safety time according to the positions, speeds, and accelerations of such two vehicles, and determines whether there is an impact for the relative position distance; if there is an impact for the relative position distance, the current onboard-terminal immediately transmits warning information to the driver, and simultaneously transmits the warning information to the onboard-terminal of the ahead vehicle, and the onboard-terminal of the ahead vehicle transmits the information obtained by its determination and the received warning information to the its driver;

during the current onboard-terminal driving at a normal speed, when the ahead vehicle is changing lanes, the moment the current onboard-terminal receives the driving data of the onboard-terminal of the ahead vehicle, the current onboard-terminal calculates a relative position distance between two vehicles within a safety time according to the positions, speeds, and accelerations of such two vehicles, and determines whether there is an impact for the relative position distance; if there is an impact for the relative position distance, the current onboard-terminal transmits information about paying attention to lane changing of the ahead vehicle to the driver, and transmits prompt information about paying attention to safety driving to the onboard-terminal of the ahead vehicle in the meantime;

during the current onboard-terminal driving at a normal speed, when a following vehicle is overtaking, the moment the current onboard-terminal receives the driving data of an onboard-terminal of the following vehicle, the current onboard-terminal calculates a relative position distance between two vehicles within a safety time according to the positions, speeds, and accelerations of such two vehicles, and determines whether there is an impact for the relative position distance; if there is an impact for the relative position distance, the current onboard-terminal gives a warning about paying attention to the following vehicle to the driver, and transmits prompt information about paying attention to the ahead vehicle to the onboard-terminal of the following vehicle;

during the acceleration, the current onboard-terminal calculates a relative position distance between each of the vehicles ahead within a safety time according to the positions, speeds, and accelerations of such two vehicles, and determines whether there is an impact for the relative position distance; if there is an impact for the relative position distance, the current onboard-terminal transmits corresponding warning information to the driver by human-computer interaction, and reversely feeds the warning information back to the corresponding vehicles.

5. A cloud server of the intelligent traffic safety pre-warning method according to claim 1, comprising: a first processor, the first processor is connected to a first storage and a first human-computer interaction module respectively, the first processor is further connected to an onboard-terminal through a first communication module, the first storage stores computer instructions performed on the first processor, and when the computer instructions are performed on the first processor, the following steps are performed:

receiving a position, speed, acceleration or direction sent by the onboard-terminal, determining, by the cloud server, a driver's driving danger coefficient according to the position, speed, and acceleration information within a set e period, calculating the probability that a current vehicle has an accident within a set range of a current road segment based on the driver's driving danger coefficient, horizontal and longitudinal indicators of the road segment and accident probabilities under the corresponding indicators, and feeding back, if the probability exceeds a set threshold, a danger warning to the onboard-terminal;

based on the received position, speed, acceleration or direction of a current onboard-terminal, calculating, by the cloud server, surrounding onboard-terminals that may enter a set range of the current onboard-terminal within a set time according to the position, the speed and the acceleration, and transmitting communication addresses of the interfering surrounding onboard-terminals to the current onboard-terminal; and broadcasting the location and communication addresses of an accident to all the onboard-terminals along the road segment affected by the accident to prompt other onboard-terminals to slow down.

6. An onboard-terminal of the intelligent traffic safety pre-warning method according to claim 1, comprising: a second processor, the second processor is connected to a positioning module, a second storage, and a second human-computer interaction module respectively, the second processor is further connected to a cloud server through a second communication module, the second storage stores computer instructions performed on a second processor, and when the computer instructions are performed on the second processor, the following steps are performed:

establishing a communication connection with the cloud server; acquiring data, and uploading the acquired data to the cloud server; receiving feedbacks from the cloud server, wherein the feedback comprising the probability that a current vehicle has an accident within a set range of the current road segment; after receiving the probability that the current vehicle has an accident within the set range of the current road segment, transmitting, if the probability exceeds a set danger value, the feedback to a driver by human-computer interaction;

receiving communication addresses of surrounding onboard-terminals within the set range transmitted by the cloud server, and establishing a connection relationship with the surrounding onboard-terminals through the communication addresses; broadcasting the position, speed, acceleration or driving behavior safety coefficient to the surrounding onboard-terminals, and receiving driving data of the surrounding onboard-terminals as such.

7. An intelligent traffic safety pre-warning system, comprising:

a cloud server and an onboard-terminal in the intelligent traffic safety pre-warning method according to claim 1, the cloud server comprising: a first processor, the first processor is connected to a first storage and a first human-computer interaction module respectively, the first processor is further connected to an onboard-terminal through a first communication module, the first storage stores computer instructions performed on the first processor, and when the computer instructions are performed on the first processor, the following steps are performed:

receiving a position, speed, acceleration or direction sent by the onboard-terminal, determining, by the cloud server, a driver's driving danger coefficient according to the position, speed, and acceleration information within a set time period, calculating the probability that a current vehicle has an accident within a set range of a current road segment based on the driver's driving danger coefficient, horizontal and longitudinal indicators of the road segment and accident probabilities under the corresponding indicators, and feeding back, if the probability exceeds a set threshold, a danger warning to the onboard-terminal;

based on the received position, speed, acceleration or direction of a current onboard-terminal, calculating, by the cloud server, surrounding onboard-terminals that may enter a set range of the current onboard-terminal within a set time according to the position, the speed and the acceleration, and transmitting communication addresses of the interfering surrounding onboard-terminals to the current onboard-terminal; and broadcasting the location and communication addresses of an accident to all the onboard-terminals along the road segment affected by the accident to prompt other onboard-terminals to slow down; and the onboard-terminal comprising: a second processor, the second processor is connected to a positioning module, a second storage, and a second human-computer interaction module respectively, the second processor is further connected to the cloud server through a second communication module, the second storage stores computer instructions performed on a second processor, and when the computer instructions are performed on the second processor, the following steps are performed:

establishing a communication connection with the cloud server; acquiring data, and uploading the acquired data to the cloud server; receiving feedbacks from the cloud server, wherein the feedback comprising the probability that a current vehicle has an accident within a set range of the current road segment; after receiving the probability that the current vehicle has an accident within the set range of the current road segment, transmitting, if the probability exceeds a set danger value, the feedback to a driver by human-computer interaction;

receiving communication addresses of surrounding onboard-terminals within the set range transmitted by the cloud server, and establishing a connection relationship with the surrounding onboard-terminals through the communication addresses; broadcasting the position, speed, acceleration or driving behavior safety coefficient to the surrounding onboard-terminals, and receiving driving data of the surrounding onboard-terminals as such.

* * * * *